No. 694,582. Patented Mar. 4, 1902.
E. A. RICHARDSON.
PLUG OR BUSH FOR CONNECTING WIRES OR BARS TO PIECES OF METAL.
(Application filed July 20, 1901.)
(No Model.)
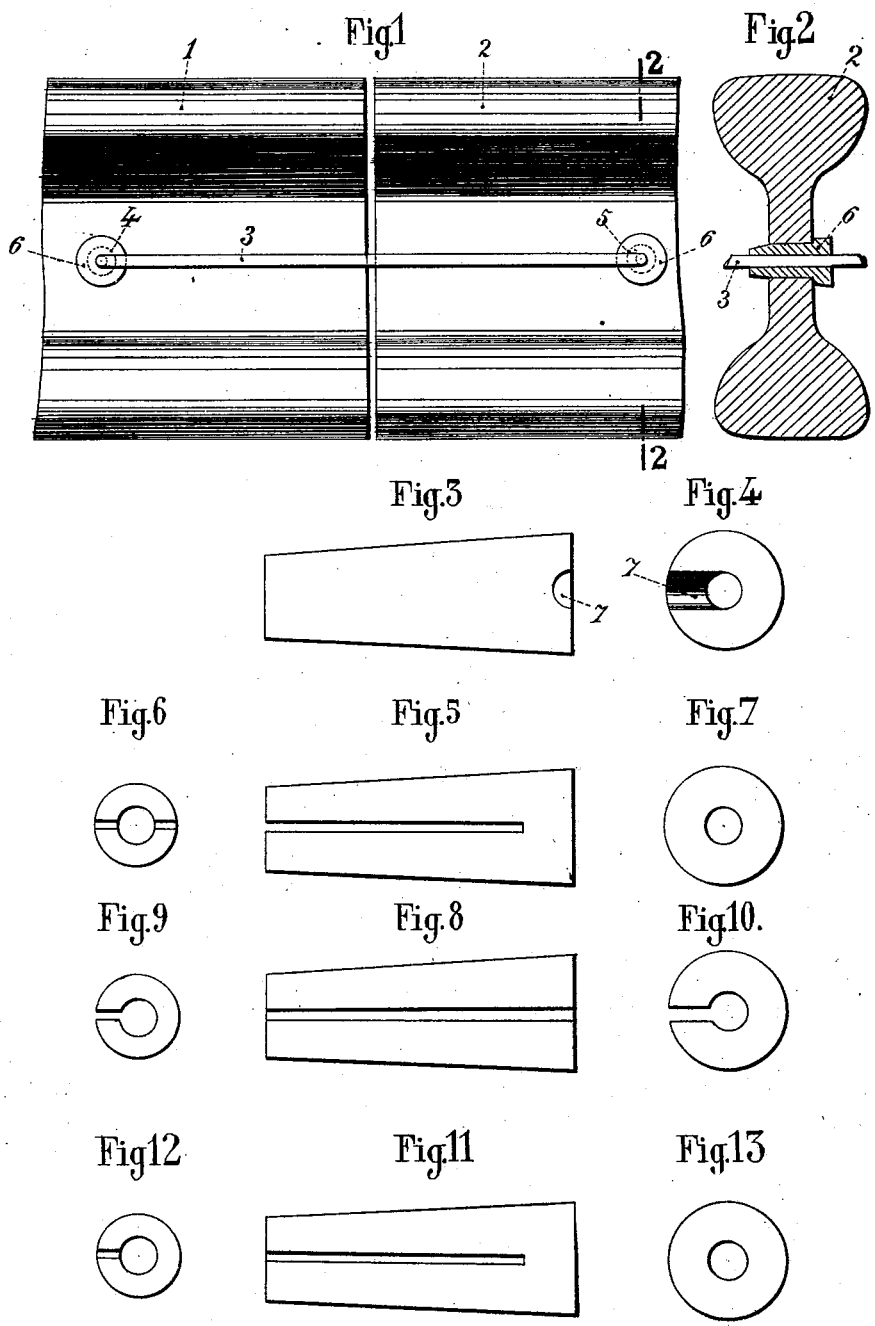

UNITED STATES PATENT OFFICE.

ERNEST ARDISANA RICHARDSON, OF CHARENTON, FRANCE.

PLUG OR BUSH FOR CONNECTING WIRES OR BARS TO PIECES OF METAL.

SPECIFICATION forming part of Letters Patent No. 694,582, dated March 4, 1902.

Application filed July 20, 1901. Serial No. 69,020. (No model.)

*To all whom it may concern:*

Be it known that I, ERNEST ARDISANA RICHARDSON, a citizen of the United States, residing at Charenton, in the Republic of France, have invented certain new and useful Improvements in Plugs or Bushes for Connecting a Wire or Bar to a Piece of Metal, of which the following is a specification.

This invention has for its object a plug or bush for connecting a wire or bar to a piece of metal. Its object is to prevent direct contact of the wire or bar with the piece of metal and to avoid all cutting or weakening of the wire or bar when in position. Up to the present metal wedges were employed for this purpose, which squeezed the wire against the rail.

By means of the plug or bush forming the subject of the present invention perfect connection is made and the wire is not in direct contact with the piece of metal.

In the annexed drawing I have shown the two ends of the rails connected by a metal wire in order to insure continuous passage of an electric current between them. The wire is threaded through the conical plugs, which form the subject of the present invention.

Figure 1 is an elevation of the two portions of rail, and Fig. 2 is a section on the line 2 2 in Fig. 1. Figs. 3 to 13 show modifications of the plug, which is always conical. The plug may be solid and be provided with notches, as in Figs. 3 and 4, or it may be split on two sides, the splits extending for a portion only of the length of the plug, as shown in Figs. 5, 6, 7. Again, the plug may be split upon one side only, the split extending the whole length of the plug, as shown in Figs. 8, 9, and 10. Lastly, the plug may be split on one side only, the split extending partly down for a portion only of the length of the plug; but all when once in place completely surround the wire and prevent direct contact with the rail. This is the characteristic feature of the present invention.

The method of employing these plugs is shown in Figs. 1 and 2, in which 1 and 2 are the portions of the rail to be connected together. The rails are provided with holes 4 and 5, in which a conical plug 6 is placed, through which plug a wire 3 is threaded, as shown. This wire is bent, and by means of a hammer the plug 6 is forced into the hole in the rail, the shape of which it takes, it losing its own conical shape. The deformation or cutting due to this squeezing action is borne by the plug, the wire remaining untouched.

In Fig. 3 I have shown a plug provided with a notch 7, which has for its object to allow the end of the wire passing out from the plug to be bent. Lastly, if the plug is too large to insure the wire being sufficiently squeezed it may be split along a generator of the cone, the split extending the whole or a portion of the length of the plug.

I do not wish to limit myself to the details of carrying out the invention, which may be altered when necessary.

I claim—

In a device of the character described, in combination with the metal part having a cylindrical opening or perforation, of a plug or bush adapted to be driven into said opening or perforation, said plug or bush having an external conical surface tapering from end to end, a notch 7, in its upper or larger face, and a recess splitting the plug or bush diametrically and extending longitudinally from the smaller toward the larger end, but not through said larger end, and a wire adapted to enter a center or axial opening in said plug or bush and to be clamped tightly therein as the plug or bush is advanced in the perforation or opening in the metal part, said wire adapted, when bent at right angles to the axial opening of the plug, to rest in the notch 7, of said plug.

In testimony whereof I have signed this specification in the presence of two subscribing witnesses.

ERNEST ARDISANA RICHARDSON.

Witnesses:
PAUL DE MESTRAL,
EDWARD P. MACLEAN.